(12) United States Patent
Melikian

(10) Patent No.: US 9,885,562 B2
(45) Date of Patent: Feb. 6, 2018

(54) MEASURING SYSTEM AND METHOD USING LIGHT SOURCE AND CYLINDRICAL MIRROR

(71) Applicant: Recognition Robotics, Inc., Elyria, OH (US)

(72) Inventor: Simon Melikian, Westlake, OH (US)

(73) Assignee: Recognition Robotics, Inc., Elyria, OH (US)

( * ) Notice: Subject to any disclaimer, the term of this patent is extended or adjusted under 35 U.S.C. 154(b) by 20 days.

(21) Appl. No.: 14/791,558

(22) Filed: Jul. 6, 2015

(65) Prior Publication Data

US 2017/0010088 A1 Jan. 12, 2017

(51) Int. Cl.
| | |
|---|---|
| G06K 9/00 | (2006.01) |
| G01B 11/25 | (2006.01) |
| G02B 5/10 | (2006.01) |
| B05C 5/02 | (2006.01) |
| B05C 11/10 | (2006.01) |

(52) U.S. Cl.
CPC ............ G01B 11/25 (2013.01); B05C 5/0216 (2013.01); B05C 11/1005 (2013.01); G02B 5/10 (2013.01)

(58) Field of Classification Search
USPC .......... 382/153, 199, 206; 250/227.2, 223 R, 250/559.08; 347/241, 242, 244; 358/401, 474, 475; 356/237.2; 359/205.1, 207.1, 619; 362/19, 606, 609; 348/148; 378/34, 84
See application file for complete search history.

(56) References Cited

U.S. PATENT DOCUMENTS

| | | | | |
|---|---|---|---|---|
| 5,313,070 A | * | 5/1994 | Vala | G02B 6/0005 250/223 R |
| 5,367,386 A | * | 11/1994 | Copenhaver | G02B 6/0005 358/401 |
| 5,533,146 A | | 7/1996 | Iwai | |
| 5,581,605 A | * | 12/1996 | Murakami | B82Y 10/00 359/619 |
| 5,748,354 A | * | 5/1998 | Iizuka | G02B 26/126 359/205.1 |
| 6,072,519 A | * | 6/2000 | Griffith | B41J 2/473 347/241 |
| 6,541,757 B2 | | 4/2003 | Bieman et al. | |
| 7,210,806 B2 | * | 5/2007 | Holman | G02B 5/045 257/E33.072 |
| 8,121,350 B2 | * | 2/2012 | Klefenz | G01C 21/00 348/148 |
| 8,538,125 B2 | | 9/2013 | Linnenkohl et al. | |
| 2010/0007733 A1 | | 1/2010 | Bachem et al. | |
| 2015/0146969 A1 | | 5/2015 | Gruber | |

\* cited by examiner

*Primary Examiner* — Anh H Do
(74) *Attorney, Agent, or Firm* — Rankin, Hill & Clark LLP

(57) ABSTRACT

A measurement system includes a cylindrical mirror, a light source, a photosensitive array, and a processor. The light source is configured and positioned with respect to the cylindrical mirror such that light from the light source is reflected from the cylindrical mirror as a circular arc on an object surface. The photosensitive array is positioned with respect to the cylindrical mirror to detect the circular arc on the object surface. The processor is in communication with the photosensitive array and is configured to detect a break in the circular arc and to measure a substance applied to the object surface based on an image detected by the photosensitive array.

16 Claims, 4 Drawing Sheets

MEASURING SYSTEM AND METHOD USING LIGHT SOURCE AND CYLINDRICAL MIRROR

BACKGROUND

Robotic dispensing systems, which can be used to dispense an adhesive, sealant or similar material as a bead along a path, can include a robot arm that moves with respect to a substrate upon which the material is to be applied. In bead dispensing applications, there is a need to measure the width and height of the bead as the material is being dispensed along the bead path. Because of the difficulty in robot programming, it is undesirable to turn robot tooling, such as the nozzle that is dispensing the material, so that the bead is dispensed in the same travel direction of the nozzle along the entire bead path. For example, when the bead path is to take 90 degree left turn on the substrate, the nozzle on the robot likely will not be rotated 90 degrees at the corner of the turn, but instead the robot arm will simply change the direction in which the nozzle was traveling.

To accommodate for the changing direction of the bead path and the need to measure the width and height of the bead, known bead measurement devices employ at least three cameras angularly spaced equidistantly from one another around the central axis of the nozzle. By providing at least three cameras, each camera can have a field of view of about 120 degree so that a 360 degree view around the nozzle is provided. In addition to the expense of providing three cameras and the size of the fixture to accommodate three cameras, other problems associated with using three cameras in such a measurement system are discussed in U.S. Pat. No. 8,538,125 B2.

SUMMARY

In view of the foregoing, a new measurement system is provided. The measurement system includes a cylindrical mirror, a light source, a photosensitive array, and a processor. The light source is configured and positioned with respect to the cylindrical mirror such that light from the light source is reflected from the cylindrical mirror as a circular arc on an object surface. The photosensitive array is positioned with respect to the cylindrical mirror to detect the circular arc on the object surface. The processor is in communication with the photosensitive array and is configured to detect a break in the circular arc and to measure a substance applied to the object surface based on an image detected by the photosensitive array.

In the measurement system described above, the light source can be referred to as a first light source and the photosensitive array can be referred to as a first photosensitive array such that a second light source and a second photosensitive array can be provided. The first light source is configured and positioned with respect to the cylindrical mirror such that light from the first light source is reflected from the cylindrical mirror as a first circular arc on the object surface. The first photosensitive array is positioned with respect to the cylindrical mirror to detect the first circular arc on the object surface. The second light source is configured and positioned with respect to the cylindrical mirror and the first light source such that light from the second light source is reflected from the cylindrical mirror as a second circular arc on the object surface. The first circular arc and the second circular arc in combination surround a cylindrical mirror central axis on the object surface. The cylindrical mirror is centered on the cylindrical mirror central axis. The second photosensitive array is positioned with respect to the cylindrical mirror and the first photosensitive array to detect the second circular arc on the object surface such that in combination with the first photosensitive array, a 360 degree view around the cylindrical mirror on the object surface is provided.

A dispensing assembly is also provided in view of the above. The dispensing assembly includes a nozzle and a frame operatively connected with the nozzle. The frame is configured to connect with an associated robot arm. The cylindrical mirror, the first light source, the second light source, the first photosensitive array, and the second photosensitive array described above can each be operatively connected with the frame.

A method for measuring a substance being applied to a substrate is also described. The method includes projecting light onto a cylindrical mirror such that a circular arc is reflected from the cylindrical mirror onto a substrate to which a bead of substance is being applied. The method further includes capturing with a photosensitive array an image of the circular arc and the bead intersecting the circular arc. The method further includes determining a dimension of the bead based on the captured image.

DETAILED DESCRIPTION

Figure 1:
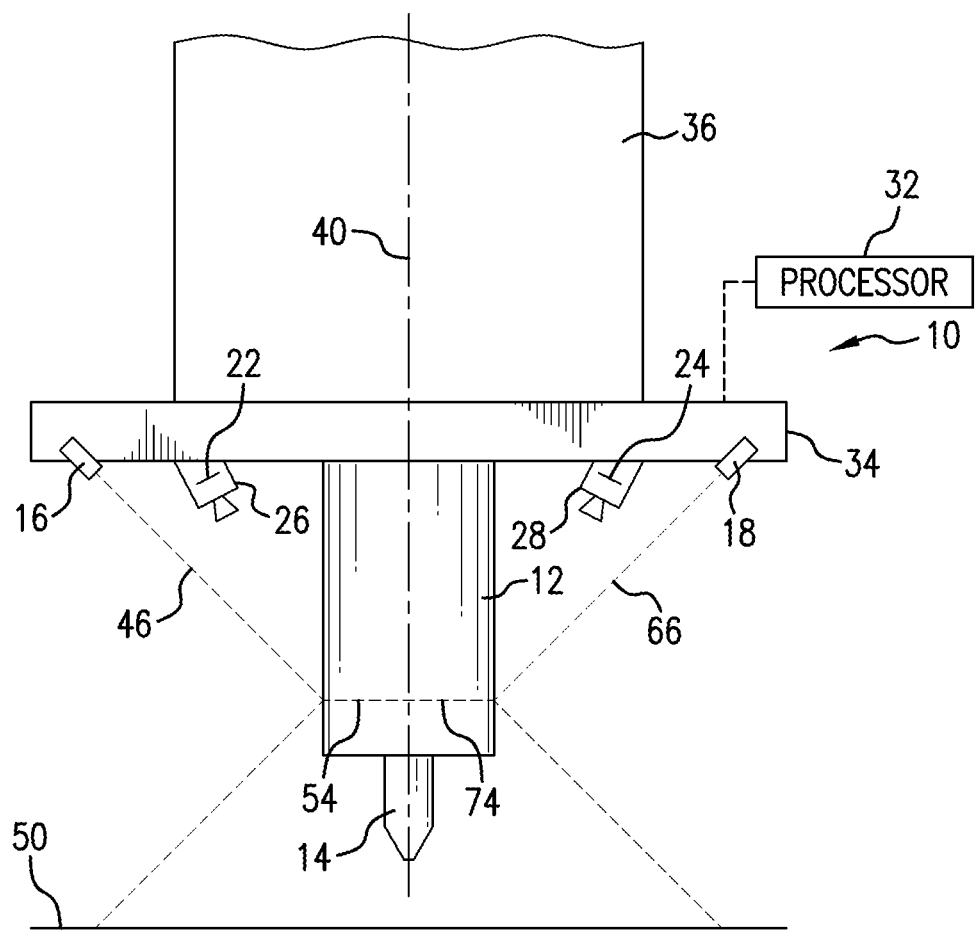
FIG. 1 is a schematic side view of a measurement system.

FIG. 1 depicts a measuring system 10 that can be useful to measure a material being deposited as a bead along a path on a substrate. The measuring system 10 includes a cylindrical mirror 12, which can be positioned around a nozzle 14 that is configured to dispense the material as a bead along a bead path, when the measurement system is used to measure dimensions of a material being deposited as a bead. Examples of materials that can be deposited as a bead by the nozzle 14 include adhesives, sealants, and similar materials. The measuring system 10, however, is not limited to only measuring materials that are deposited along a bead path, but could be used to measure other items in other environments. In these other environments, the cylindrical mirror 12 may or may not be positioned to surround a tool performing work.

The measuring system 10 also includes a light source; two light sources 16, 18 are shown in the illustrated embodiment. The measuring system 10 further includes a photosensitive array; two photosensitive arrays 22, 24 are provided in the illustrated embodiment. The first photosensitive array 22 can be provided as part of a first camera 26. Similarly, the second photosensitive array 24 can also be provided as part of a second camera 28. The measuring system 10 also includes a processor 32 that is in communication with the photosensitive arrays 22, 24 and the light sources 16, 18. The light sources 16, 18 and the cameras 26, 28 connect with a frame 34. As illustrated in FIG. 1, the frame 34 is operatively connected with the nozzle 14 for movement therewith. The frame 34 is also configured to connect with an associated robot arm 36 (only an end of which is shown in FIG. 1) for movement with the robot arm.

Each light source 16, 18 is rotationally fixed with respect to a cylindrical mirror central axis 40 about which both the cylindrical mirror 12 and the nozzle 14 are centered. In the illustrated embodiment, the light sources 16, 18 do not rotate with respect to cylindrical mirror 12 or the nozzle 14 when the frame 34 is connected with the robot arm 36. This allows the conventional robot programming where the robot tooling, e.g., the nozzle 14, does not rotate or turn so that the bead B (FIG. 3) being dispensed from the nozzle 14 is not dispensed always in the same direction of travel along the entire bead path. Each light source 16, 18 is configured to produce a fan of light directed toward the cylindrical mirror 12. A laser or linear LED is an example of such a light source configured to produce a fan of light.

Figure 2:
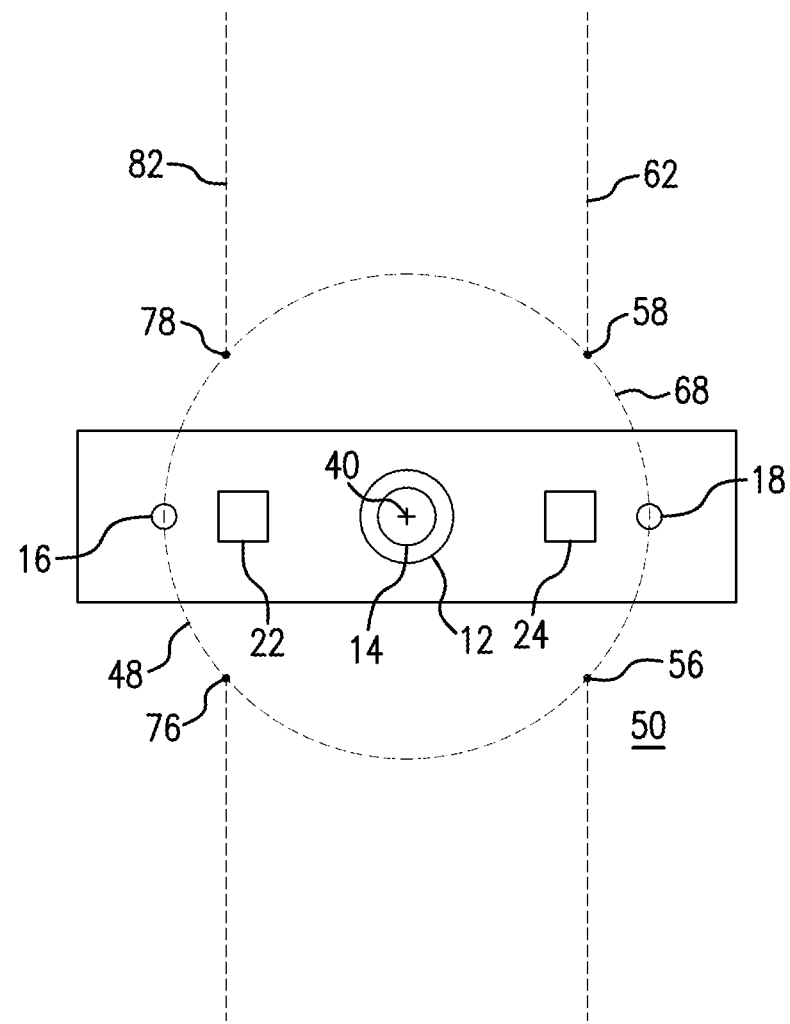
FIG. 2 is a schematic cross-sectional view taken along line 2-2 of FIG. 1.
Figure 3:
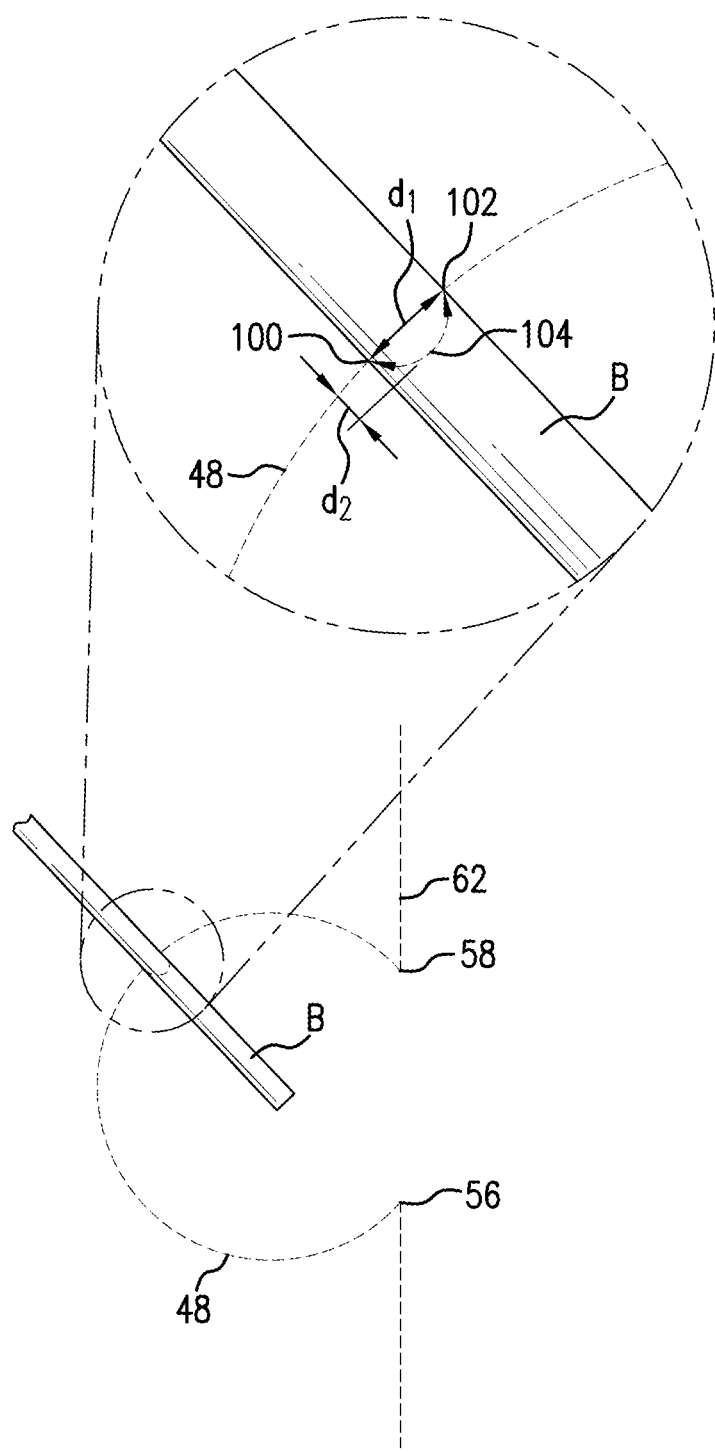
FIG. 3 depicts an image captured by a photosensitive array of the measurement system shown in FIG. 1.

With reference to FIG. 1, the first light source 16 is configured and positioned with respect to the cylindrical mirror 12 such that light (schematically depicted as line 46 in FIG. 1) from the first light source 16 is reflected from the cylindrical mirror 12 as a first circular arc 48 (FIG. 2) on an object surface 50. In the illustrated embodiment, the first light source 16 is configured to produce a first fan of light which is projected as a first line of light 54 on the cylindrical mirror 12. With reference to FIG. 2, the cylindrical mirror 12 is configured to reflect this first line of light 54 as the first circular arc 48, although because of the position of the first light source 16 with respect to the cylindrical mirror 12, the first circular arc 48 does not surround the entirety of the cylindrical mirror 12 and the nozzle 14. In other words, the first circular arc 48 does not extend 360 degrees around the cylindrical mirror central axis 40, the cylindrical mirror 12 or the nozzle 14. As seen in FIG. 2, the first circular arc 48 has end points 56 and 58. Also, a first line of light 62, which is not reflected by the cylindrical mirror 12, is projected from the first light source 16 onto the object surface 50. The first circular arc 48 is also shown in FIG. 3, which shows light reflected by the cylindrical mirror 12 from the first light source 16, but does not show light from the second light source 18, to more clearly show the end points 56, 58 and the first line of light 62. The end points 56, 58 are points of inflection where the first circular arc 48 no longer follows a radius and transitions to the first line of light 62.

The second light source 18 can be identical in configuration to the first light source 16. As more clearly seen in FIG. 2, the second light source 18 is angularly spaced 180 degrees from the first light source 16 about the cylindrical mirror central axis 40. The second light source 18 is configured and positioned with respect to the cylindrical mirror 12 and the first light source 16 such that light (depicted as dashed line 66 in FIG. 1) from the second light source 18 is reflected from the cylindrical mirror 12 as a second circular arc 68 (FIG. 2) on the object surface 50. The second light source 18 is configured to produce a second fan of light which is projected as a second line of light 74 on the cylindrical mirror 12. With referenced to FIG. 2, the cylindrical mirror 12 is configured to reflect this second line of light 74 as a second circular arc 68, although because of the position of the second light source 18 with respect to the cylindrical mirror 12, the second circular arc 68 does not surround the entirety of the cylindrical mirror 12 and the nozzle 14.

With reference to FIG. 2, the first circular arc 48 and the second circular arc 68 in combination surround the cylindrical mirror central axis 40 on the object surface 50. As shown in FIG. 2, the first circular arc 48 is co-extensive with at least a portion of the second circular arc 68; however, this is not necessary. For example the second circular arc 68 could be offset inwardly or outwardly with respect to the first circular arc 48. By having the first circular arc 48 and the second circular arc 68 in combination surround the cylin-drical mirror central axis 40, a 360 degree measurement line around the cylindrical mirror 12 on the object surface 50 is provided.

With reference to FIG. 2, the second circular arc 68 does not extend 360 degrees around the cylindrical mirror central axis 40, the cylindrical mirror 12 or the nozzle 14. As seen in FIG. 2, similar to the first circular arc 48 the second circular arc 68 has end points 76 and 78. Also, a second line of light 82, which is not reflected by the cylindrical mirror 12, is projected from the second light source 18 onto the object surface 50.

As discussed above, each photosensitive array 22, 24 is positioned within a respective camera 26, 28 in the illustrated embodiment. With reference to FIG. 2, the first photosensitive array 22 is angularly spaced 180 degrees from the second photosensitive array 24 about the cylindrical mirror central axis 40. Similar to the light sources 16, 18, the photosensitive arrays 22, 24 are also rotationally fixed with respect to the cylindrical mirror axis 40 so as not to rotate with respect to the cylindrical mirror axis 40. This also fixes the photosensitive arrays 22, 24 rotationally with respect to the cylindrical mirror 12 and the nozzle 14, i.e., the photosensitive arrays 22, 24 do not rotate with respect to the cylindrical mirror 12 and the nozzle 14. As seen in FIG. 2, the photosensitive arrays 22, 24 are aligned with the light sources 16, 18 along a line perpendicular to the cylindrical mirror central axis 40. Such a configuration can reduce size of the frame 34 to which the light sources 16, 18 and the cameras 26, 28 mount. The photosensitive arrays 22, 24 can be located elsewhere, however, it is desirable that the photosensitive arrays 22, 24 are situated so as to provide a 360 degree view around the cylindrical mirror 12 on the object surface 50. For example, in the illustrated embodiment each photosensitive array 22, 24 is configured to capture slightly more than 180 degrees around the cylindrical mirror 12 so that in combination the first photosensitive array 22 and the second photosensitive array 24 provide a 360 degree view around the cylindrical mirror 12.

Each photosensitive array 22, 24 is positioned with respect to the cylindrical mirror 12 to detect a respective circular arc 48, 68 on the object surface 50. In the illustrated embodiment, the first photosensitive array 22 and the second photosensitive array 24 are equidistant from the cylindrical mirror central axis 40. Also, the first photosensitive array 22 is positioned with respect to the cylindrical mirror 12 to detect the first circular arc 48 on the object surface 50. Similarly, the second photosensitive array 24 is positioned with respect to the cylindrical mirror 12 and the first photosensitive array 22 to detect the second circular arc 68 on the object surface 50. In combination, the first photosensitive array 22 and the second photosensitive array 24 provide a 360° view around the cylindrical mirror 12 on the object surface 50. The photosensitive arrays 22, 24 can be conventional CCD sensors having a photosensitive array matrix that can resolve a received image into a plurality of pixels to allow for calculations in an x, y, and z-coordinate system. The processor 32 is in communication with the photosensitive arrays 22, 24 and is configured to detect a break 100, 102 (FIG. 3) in a respective circular arc 48, 68 and to measure a substance being applied to the object surface 50 based on an image detected by the photosensitive array 22, 24.

FIG. 3 depicts an image detected by the photosensitive array 22, for example. A bead B of material has been applied to the object surface 50 by the nozzle 14. As discussed above, in bead dispensing applications, it is desirable to measure the width and height of the bead B as material is being dispensed along the bead path. It is also difficult to program the robot, to which the robot arm 36 is attached, so that the nozzle 14 rotates about a nozzle central axis, which would be coincident with the cylindrical mirror central axis 40 shown in FIG. 1, while the nozzle 14 is dispensing material to form the bead B. As such, any fixture, such as the frame 34, fixed to the robot arm 36 also does not rotate about the cylindrical mirror central axis 40 with respect to the nozzle 14. Accordingly, if the cylindrical mirror 12 was not used, a line of light similar to the first line of light 62 in FIG. 3 could be projected onto the object surface 50 by the first light source 16 and measurements could be made using this line of light if the bead B crossed over this line of light. However, if the nozzle 14 traveled in a direction parallel to or away from the first line of light 62, and the cylindrical mirror 12 was not in use so that the first circular arc 48 was not provided, then measurements of the width and height of the bead B could not be performed using this line of light.

By providing the cylindrical mirror 12, the first circular arc 48 is projected onto the object surface 50. The processor 32 can detect a first break 100 in the first circular arc 48 and a second break 102 in the first circular arc 48. Each break 100 and 102 is where a point of inflection resides and the first circular arc 48 transitions to the first line of light 62. The processor 32 can run known software and algorithms to detect each break 100, 102. The distance $d_1$ between the first break 100 and the second break 102 can be a function of the width of the bead B. The processor can be further configured to detect another point of inflection 104 between the first break 100 and the second break 102. The distance $d_2$ between the first break 100 (or the second break 102) and the point of inflection 104 can be a function of the height of the bead B. The width and the height of the bead B can be determined using known trigonometric equations and the type (size) of the CCD array used for the photosensitive arrays 22, 24.

As seen in FIG. 3, because of the location of the first light source 16 with respect to the cylindrical mirror 12, the first circular arc 48 does not entirely surround the cylindrical mirror 12. If the path for the bead B was known always to cross the first circular arc 48, then only the first light source 16 and the first photosensitive array 22 may be necessary to measure the height and width of the bead B. This, however, is not always the case. As such, the second light source 18 and second photosensitive array 24 can be provided. The second light source 18 is shown as being 180 degrees offset from first light source 16 about the cylindrical mirror central axis 40; however, the second light source 18 can be spaced elsewhere. However, it is desirable to space the second light source 18 from the first light source 16 an angular distance sufficient enough to provide a 360° view around the nozzle 14.

Figure 4:
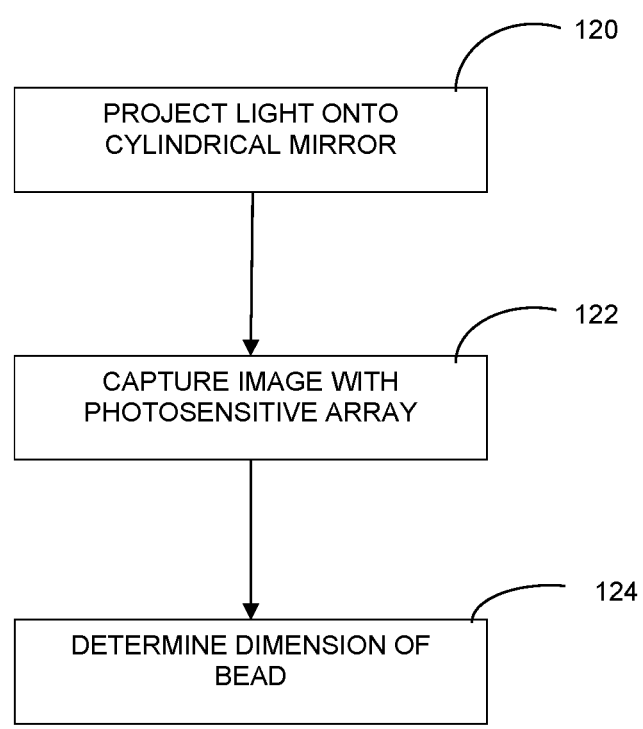

A method for measuring a substance being applied to a substrate includes, at 120 in FIG. 4, projecting light onto a cylindrical mirror 12 such that a circular arc 48, 68 is reflected from the cylindrical mirror 12 onto a substrate to which a bead B of substance is being applied. The method can further include, at 122 in FIG. 4, capturing an image, such as that shown in FIG. 3, with a photosensitive array, such as the photosensitive arrays 22, 24, of a circular arc, such as the first circular arc 48, and the bead B intersecting the circular arc. The method can further include, at 124 in FIG. 4, determining a dimension, such as the height and width of the bead B based on the captured image.

As discussed above, because of the difficulty in robot programming, it can be difficult to turn robot tooling, such as the nozzle 14 that is dispensing material so that the bead B is dispensed in the same travel direction of the nozzle along the entire bead path. Accordingly, light can be projected using at least two light sources, such as the first light source 16 and the second light source 18, such that the cylindrical mirror central axis 40, about which the cylindrical mirror 12 is centered, is surrounded by a combination of respective circular arcs 48, 68 (see FIG. 2) generated from the light projected from the at least two light sources 16, 18 and reflected from the cylindrical mirror 12. Also, two appropriately spaced photosensitive arrays 22, 24 can be provided to provide a 360 degree view around the cylindrical mirror 12.

A measurement system and a method using the measurement system has been described above with particularity. Modifications and alterations will occur to those upon reading and understanding the preceding detailed description. The invention, however, is not limited to only the embodiments described above. Instead, the invention is broadly defined by the appended claims and the equivalents thereof. It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:
1. A measuring system comprising:
   a cylindrical mirror;
   a first light source configured and positioned with respect to the cylindrical mirror such that light from the first light source is reflected from the cylindrical mirror as a first circular arc on an object surface;
   a first photosensitive array positioned with respect to the cylindrical mirror to detect the first circular arc on the object surface;
   a second light source configured and positioned with respect to the cylindrical mirror and the first light source such that light from the second light source is reflected from the cylindrical mirror as a second circular arc on the object surface, wherein the first circular arc and the second circular arc in combination surround a cylindrical mirror central axis on the object surface, the cylindrical mirror being centered on the cylindrical mirror central axis; and
   a second photosensitive array positioned with respect to the cylindrical mirror and the first photosensitive array to detect the second circular arc on the object surface such that in combination with the first photosensitive array a 360 degree view around the cylindrical mirror on the object surface is provided; and
   a processor in communication with each photosensitive array and configured to detect a break in the circular arc and to measure a substance applied to the object surface based on an image detected by the photosensitive arrays.

2. The measuring system of claim 1, wherein the first photosensitive array and the second photosensitive array are equidistant from the cylindrical mirror central axis.

3. The measuring system of claim 1, wherein the first photosensitive array and the second photosensitive array are each rotationally fixed so as not to rotate with respect to the cylindrical mirror about the cylindrical mirror central axis.

4. The measuring system of claim 2, wherein the first light source and the second light source are each rotationally fixed so as not to rotate with respect to the cylindrical mirror about the cylindrical mirror central axis.

5. The measuring system of claim 1, wherein the first light source and the second light source are configured and positioned with respect to the cylindrical mirror such that at least a portion of the first circular arc is coextensive with at least a portion of the second circular arc.

6. The measuring system of claim 1, further comprising a frame, wherein each light source is configured to produce a fan of light and is positioned with respect to the cylindrical mirror such that each fan of light is projected as a line of light onto the cylindrical mirror, wherein the cylindrical mirror, the each light source, and each photosensitive array are each operatively connected with the frame.

7. A dispensing assembly comprising:
 a nozzle; and
 a frame operatively connected with the nozzle, the frame being configured to connect with an associated robot arm;
 wherein the cylindrical mirror, the first light source, the second light source, the first photosensitive array and the second photosensitive array of claim 1 are each operatively connected with the frame.

8. The assembly of claim 7, wherein the first light source is offset 180 degrees around the cylindrical mirror central axis from the second light source.

9. The assembly of claim 7, wherein the first photosensitive array is offset 180 degrees around the cylindrical mirror central axis from the second photosensitive array.

10. A dispensing assembly comprising:
 a nozzle;
 a frame operatively connected with the nozzle, the frame being configured to connect with an associated robot arm;
 a cylindrical mirror;
 a light source configured and positioned with respect to the cylindrical mirror such that light from the light source is reflected from the cylindrical mirror as a circular arc on an object surface;
 a photosensitive array positioned with respect to the cylindrical mirror to detect the circular arc on the object surface; and
 a processor in communication with the photosensitive array and configured to detect a break in the circular arc and to measure a substance applied to the object surface based on an image detected by the photosensitive array,
 wherein the cylindrical mirror, the light source, and the photosensitive array are each operatively connected with the frame.

11. The assembly of claim 10, wherein a nozzle central axis, about which the nozzle is centered, is coaxial with a cylindrical mirror central axis, about which the cylindrical mirror is centered.

12. The assembly of claim 10, wherein the frame is configured to connect with the associated robot arm so as to be rotationally fixed with respect to the nozzle.

13. A method for measuring a substance being applied to a substrate, the method including:
 projecting light using a light source onto a cylindrical mirror such that a circular arc is reflected from the cylindrical mirror onto a substrate to which a bead of a substance is being applied;
 capturing an image with a photosensitive array of the circular arc and the bead intersecting the circular arc; and
 determining a dimension of the bead based on the captured image.

14. The method of claim 13, wherein projecting light onto the cylindrical mirror further includes projecting light using at least two light sources such that a cylindrical mirror central axis, about which the cylindrical mirror is centered, is surrounded by a combination of respective circular arcs generated from light projected from the at least two light sources and reflected from the cylindrical mirror.

15. The method of claim 13, wherein determining a dimension of the bead includes determining a height and a width of the bead.

16. The method of claim 15, wherein determining a height is based on a distance between a break in the circular arc and a point of inflection of an arc located between two breaks in the circular arc.

* * * * *